H. T. JOHNSON, DEC'D.
N. F. JOHNSON, ADMINISTRATRIX.
CAN CONSTRUCTION.
APPLICATION FILED MAY 29, 1912.

1,105,143.

Patented July 28, 1914.

WITNESSES
F. B. Townsend
L. A. Kelton

INVENTOR
HARRY T. JOHNSON.
BY
Townsend & Deck
ATTORNEYS.

UNITED STATES PATENT OFFICE.

HARRY T. JOHNSON, OF NEW YORK, N. Y.; NETTIE F. JOHNSON ADMINISTRATRIX OF SAID HARRY T. JOHNSON, DECEASED.

CAN CONSTRUCTION.

1,105,143.  Specification of Letters Patent.  Patented July 28, 1914.

Application filed May 29, 1912. Serial No. 700,365.

*To all whom it may concern:*

Be it known that I, HARRY T. JOHNSON, a citizen of the United States, and a resident of New York, in the county of New York and State of New York, have invented certain new and useful Improvements in Can Construction, of which the following is a specification.

My invention relates to that class of receptacles or inclosures in which the rim of the head or end is cemented or soldered to the edge or rim of the body.

The invention is particularly useful for sheet metal cans or receptacles in which the union of the meeting edges of the end and body is a soldered union.

The invention will accordingly be described with reference to this particular kind of receptacle or inclosure, although it is useful for receptacles or inclosures of other materials and for inclosures in which the union is by other sealing and uniting material than solder.

In the construction of sheet metal cans or inclosures, a common practice is to unite the end to the body by applying solder to the edge of the end and the edge of the body where said edges meet, the soldering operation being ordinarily conducted by rolling the parts while assembled and with the axis of the body inclined to the surface of the bath of solder and with the meeting edges dipping in said bath. In this construction of can, the union depends entirely upon the solder attaching itself superficially to the exposed edges of the parts, and but little if any solder enters between the edges or is effective at such points in making a good mechanical and liquid or air-tight joint.

The object of my invention is to produce a can or receptacle in which there shall be a stronger and more effective joint or union between the head or end and the body of the receptacle by the sealing material such as solder, than is possible with the constructions heretofore employed.

To these ends, my invention consists in the features of construction hereinafter more particularly described and then specified in the claims.

Figure 1:
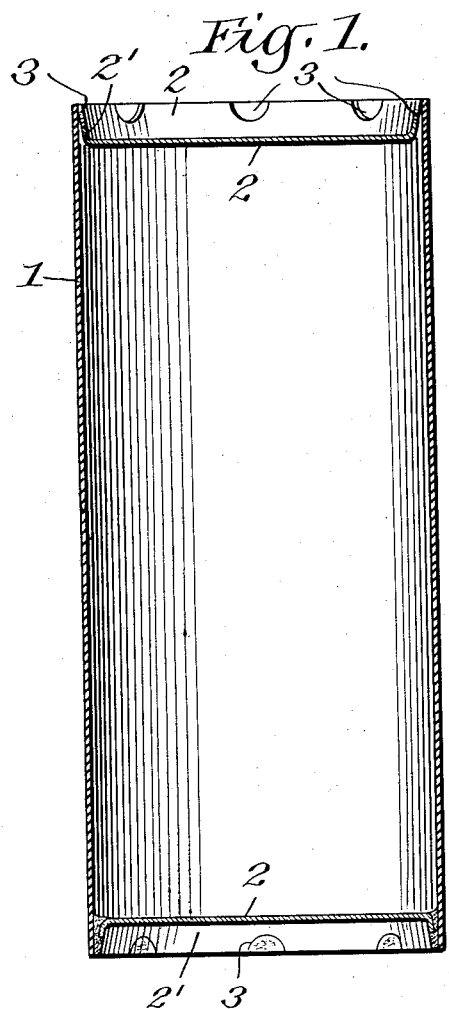
Figure 2:
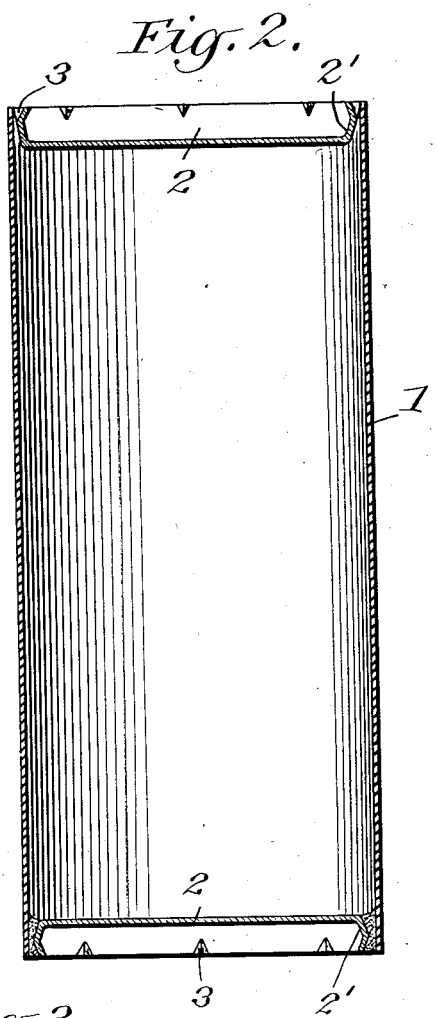
Figure 3:
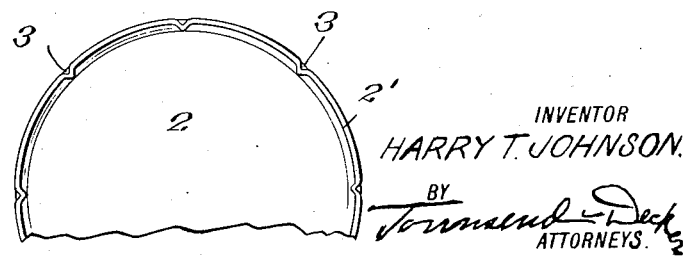

In the accompanying drawings, Figure 1 is a central section through a sheet metal can or receptacle showing at one end the head and the body assembled preparatory to the application of the sealing material and the other end after the application of sealing material, such as solder. Fig. 2 is a similar view of a can having a modified form of end. Fig. 3 is a plan view of the modified form of head or end.

1 is the body of sheet metal or other suitable material.

2 is the head or end and 2′ is an upturned edge thereof, which as shown, flares slightly so as to afford a slight space between it and the inner wall of the body opposite which it is located. Preferably, the flared edge is of a gage such that it will fit snugly in the end of the body. The slightly tapered space thus provided between the rim of the head or end and the body, affords a space for containing the sealing material such as the solder employed in the case of a sheet metal receptacle. To allow the entrance of the soldering or sealing material to this space, a number of openings into this space are provided. These openings, 3, are preferably provided in the upturned rim or edge of the head or end and they are conveniently provided by simply indenting the rim at intervals around its periphery and head as shown in Fig. 1. Said indentations may, if desired, consist simply of cuts or notches of any form. They are shown, however, in the drawing, Fig. 1, as curved. These cuts or indentations extend slightly below the edge and therefore down into the space between the inner wall of the body and the flared rim of the edge, so that any sealing material applied may flow into said sealing space.

As will be apparent, in the case of a metal can or receptacle, and in case it is desired to seal and fasten the parts by solder, it is only necessary to rotate the meeting edges of the parts in the usual manner in the soldering bath by which operation the solder is caused to flow into the space as provided as above described and form an effectual union between the body and end as shown at the bottom of the figure. Some solder will locate itself in the notches or indentations and will aid in holding the end in place by acting as a stop to prevent the end from slipping out of its place in the end of the body. Plainly, my invention is not limited to applying the sealing material in the special manner above described. Furthermore, instead of forming the indentations by cutting away the edge of the rim, it is plain that they might be formed by slightly bending the edge inward at points around its margin as more particularly indicated in Figs. 2 and 3.

What I claim as my invention is:

1. A receptacle or inclosure having an end provided with an upturned slightly flaring rim fitted into the body and having indentations at intervals along the meeting edges of the body and rim to afford openings for the entrance of sealing material into the space between the body and rim.

2. A sheet metal can or inclosure provided with an end having an upturned rim fitted into the body and having indentations at intervals along the meeting edges of the body and rim, said rim being held in place by solder in said indentations.

3. A sheet metal can or inclosure having an end provided with an upturned slightly flaring rim fitting into the body, said upturned rim being indented at intervals to permit the entrance of solder into the space between the upturned portion of the rim and the inner wall of the body, as and for the purpose described.

4. A sheet metal can having a body and end formed at their meeting edges to provide a solder holding space located beneath the meeting edges and between the body and the rim of the end, said rim being cut away at intervals and being held in place by solder in the cuts and between the rim and body.

5. A sheet metal receptacle having an end provided with an upturned edge fitted into the body, said edge being provided with cuts and held in place by solder in said cuts.

6. In a sheet metal receptacle, the combination with the body of an end having a slightly flared upturned edge cut away at intervals, said body and rim being united at their edges by solder in said cut away portion and in the space between said upturned edge and body.

7. A sheet metal can or receptacle having an end provided with an upturned indented rim fitting into the body and held therein by solder in the indentations.

Signed at New York, in the county of New York and State of New York, this 28th day of May, A. D. 1912.

HARRY T. JOHNSON.

Witnesses:
RUSSELL BUNCE,
F. B. TOWNSEND.